US012592463B2

(12) United States Patent
Hwang et al.

(10) Patent No.: US 12,592,463 B2
(45) Date of Patent: Mar. 31, 2026

(54) LITHIUM SECONDARY BATTERY AND METHOD OF REPLENISHING ELECTROLYTE IN LITHIUM SECONDARY BATTERY

(71) Applicant: SK On Co., Ltd., Seoul (KR)

(72) Inventors: Chang Mook Hwang, Daejeon (KR); Hee Soo Na, Daejeon (KR); Ga Yeong Yoo, Daejeon (KR); Moo Hyung Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 539 days.

(21) Appl. No.: 18/063,750

(22) Filed: Dec. 9, 2022

(65) Prior Publication Data

US 2023/0187797 A1     Jun. 15, 2023

(30) Foreign Application Priority Data

Dec. 15, 2021    (KR) ........................ 10-2021-0179642

(51) Int. Cl.
*H01M 50/682*          (2021.01)

(52) U.S. Cl.
CPC .................................. *H01M 50/682* (2021.01)

(58) Field of Classification Search
CPC . H01M 50/682; H01M 50/673; H01M 50/609
See application file for complete search history.

(56) References Cited

U.S. PATENT DOCUMENTS

| | | | |
|---|---|---|---|
| 6,955,187 B1 | 10/2005 | Johnson | |
| 2014/0154554 A1* | 6/2014 | Kim ..................... | H01M 50/463 |
| | | | 429/149 |
| 2015/0287548 A1 | 10/2015 | Hecht | |

FOREIGN PATENT DOCUMENTS

| | | |
|---|---|---|
| JP | 2009-076248 A | 4/2009 |
| KR | 10-2011-0132856 A | 12/2011 |
| KR | 10-2012-0069297 A | 6/2012 |
| KR | 10-2013-0021784 A1 | 3/2013 |
| KR | 10-2013-0038655 A | 4/2013 |
| KR | 10-2020-0050782 A | 5/2020 |
| KR | 10-2020-0101745 A1 | 8/2020 |

OTHER PUBLICATIONS

European Patent Office, Appl. 22213388.6, Extended European Search Report, May 30, 2023.
KIPO, Appl. 10-2021-0179642, Office Action, Jan. 9, 2026.

* cited by examiner

*Primary Examiner* — Basia A Ridley
*Assistant Examiner* — Julia Marie Fehr
(74) *Attorney, Agent, or Firm* — Jones Day

(57)          ABSTRACT
A lithium secondary battery includes an electrode assembly including a cathode and an anode facing the cathode, a case accommodating the electrode assembly, an electrolyte accommodated in the case together with the electrode assembly, and an electrolyte storage unit inserted into the case to supply a supplementary replenishment. The electrolyte storage unit includes a first unit including a first body having a tubular structure and first holes formed through the first body, and a sub-unit including a tubular body and sub-holes formed through the tubular body. The sub-unit is inserted into the first unit so that the sub-holes are offset from the first holes.

18 Claims, 4 Drawing Sheets

LITHIUM SECONDARY BATTERY AND METHOD OF REPLENISHING ELECTROLYTE IN LITHIUM SECONDARY BATTERY

CROSS-REFERENCE TO RELATED APPLICATION

This application claims priority to Korean Patent Application No. 10-2021-0179642 filed on Dec. 15, 2021 in the Korean Intellectual Property Office (KIPO), the entire disclosure of which is incorporated by reference herein.

BACKGROUND

1. Field

The present invention relates to a lithium secondary battery and a method for replenishing an electrolyte in a lithium secondary battery. More particularly, the present invention relates to a lithium secondary battery including an electrode assembly and an electrolyte impregnating the electrode assembly, and a method for replenishing an electrolyte in a lithium secondary battery

2. Description of the Related Art

A secondary battery which can be charged and discharged repeatedly includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, a low-capacity lithium secondary battery may be used as a power source for a small electronic device such as a cellular phone, a laptop computer, a camcorder, etc. A high-capacity lithium secondary battery may be used as a power source for a large electronic device such as an electric vehicle, a hybrid vehicle, etc.

For example, the lithium secondary battery may include an electrode assembly including a cathode, an anode and a separation layer interposed therebetween, and an electrolyte immersing the electrode assembly. The lithium secondary battery may further include a case for accommodating the electrode assembly and the electrolyte.

For example, the lithium secondary battery may be charged and discharged through an electrochemical reaction of the cathode, the anode, and the electrolyte.

When the lithium secondary battery is repeatedly charged and discharged, the electrolyte may be transformed due to a side reaction, and an amount of the electrolyte in the lithium secondary battery may be gradually reduced. Accordingly, a capacity retention of the lithium secondary battery may also be gradually decreased, thereby reducing a life-span.

For example, Korean Published Patent Application No. 10-2011-0132856 discloses a method of replenishing an electrolyte in a lithium secondary battery.

SUMMARY

According to an aspect of the present invention, there is provided a lithium secondary battery having improved life-span property.

According to an aspect of the present invention, there is provided a method of replenishing an electrolyte in a lithium secondary battery with high reliability.

A lithium secondary battery includes an electrode assembly including a cathode and an anode facing the cathode, a case accommodating the electrode assembly, an electrolyte accommodated in the case together with the electrode assembly, and an electrolyte storage unit inserted into the case to supply a supplementary electrolyte. The electrolyte storage unit includes a first unit including a first body having a tubular structure and first holes formed through the first body, and a sub-unit including a tubular body and sub-holes formed through the tubular body. The sub-unit is inserted into the first unit so that the sub-holes are offset from the first holes.

In some embodiments, the electrolyte storage unit may further include a second unit that includes a second body having a tubular structure and second holes formed through the second body. The second unit may be inserted between the first unit and the sub-unit so that at least one of the second holes overlaps at least one of the first holes.

In some embodiments, the second holes may be arranged to be offset from the sub-holes.

In some embodiments, an inner surface of the first body and an outer surface of the second body may have a screw structure to be fastened to each other.

In some embodiments, the first unit may have a first coefficient of thermal expansion, and the second unit may have a second coefficient of thermal expansion different from the first coefficient of thermal expansion.

In some embodiments, the second coefficient of thermal expansion may be greater than the first coefficient of thermal expansion.

In some embodiments, the second unit may be physically separable from the first unit at a temperature of $-20°$ C. or less, or $40°$ C. or higher.

In some embodiments, the sub-unit may include a first sub-unit and a second sub-unit which are inserted into both end portions of the first unit.

In some embodiments, the electrolyte storage unit may further include a first packing unit coupled to one end portion of the first sub-unit, and a second packing unit coupled to one end portion of the second sub-unit.

In some embodiments, the first sub-unit and the second sub-unit may be disposed in the first unit to be spaced apart from each other in a longitudinal direction of the first unit.

In some embodiments, the first sub-unit and the second sub-unit may be movable by an external force in the longitudinal direction so that at least one of the sub-holes overlaps at least one of the first holes.

In some embodiments, the case may include a first space accommodating the electrode assembly and the electrolyte, a second space into which the electrolyte storage unit is inserted, and a passage portion through which the supplementary electrolyte is capable of being transferred between the first space and the second space.

In some embodiments, the second space may extend in a longitudinal direction of the electrode assembly.

In some embodiments, the passage portion may include a sealing line portion that is capable of being opened by a pressure due to a discharge of the supplementary electrolyte.

In a method of replenishing an electrolyte in a lithium secondary battery, the lithium secondary battery according to the above-described embodiments is prepared. The supplementary electrolyte is discharged from the electrolyte storage unit to an peripheral portion of the electrode assembly when at least a portion of the electrolyte is consumed.

In some embodiments, in the discharging the supplementary electrolyte, the sub-unit may be moved so that at least one of the sub-holes overlaps at least one of the first holes.

In some embodiments, the electrolyte storage unit may further include a second unit including a second body having a tubular structure and second holes formed thorough the second body. The second unit may be inserted between the first unit and the sub-unit so that at least one of the second holes overlaps at least one of the first holes.

In some embodiments, the lithium secondary battery may be cooled or heated to form a gap between the first unit and the second unit in the electrolyte storage unit from which the supplementary electrolyte is discharged. A replacement unit that includes a second unit and a sub-unit filled with a supplementary electrolyte may be prepared. The replacement unit filled with the supplementary electrolyte may be inserted into the first unit to separate the second unit and the sub-unit from which the supplementary electrolyte is discharged from the first unit.

A lithium secondary battery according to exemplary embodiments may include an electrode assembly and an electrolyte accommodated in a main-chamber of a case and an electrolyte storage unit including a supplementary electrolyte. When the electrolyte of the main chamber is consumed, the electrolyte storage unit may supply the supplementary electrolyte to the main chamber Accordingly, a battery cell may have improved life-span properties.

In exemplary embodiments, the supplementary electrolyte may be supplied to the main-chamber while maintaining an airtightness of the main-chamber. Accordingly, damages to the lithium secondary battery due to an infiltration of external air and moisture when replenishing the electrolyte may be prevented.

In exemplary embodiments, the supplementary electrolyte may be added to the electrolyte storage unit while maintaining the airtightness of the main-chamber. Accordingly, the lithium secondary battery may have more improved life-span properties.

DETAILED DESCRIPTION OF THE EMBODIMENTS

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
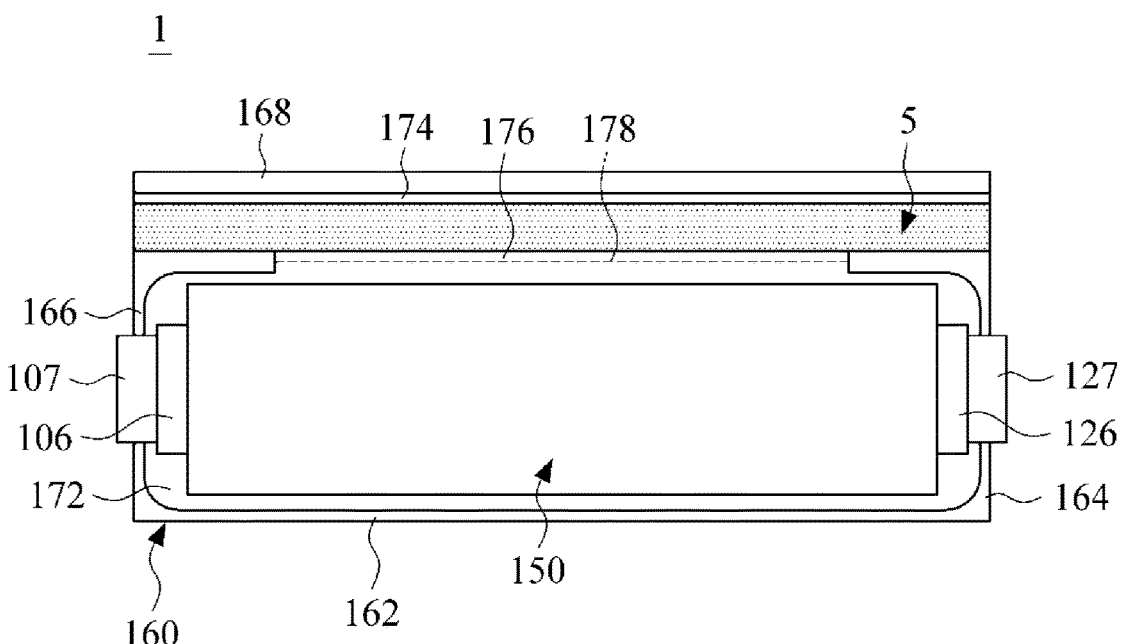
FIG. 1 is a schematic projected plan view of a lithium secondary battery according to exemplary embodiments.

Referring to FIG. 1, a lithium secondary battery 1 includes an electrode assembly 150; an electrolyte (not illustrated) impregnating the electrode assembly 150; an electrolyte storage unit 5 containing a supplementary electrolyte; and a case 160 accommodating the electrode assembly 150, the electrolyte and the electrolyte storage unit 5. For example, the electrolyte storage unit 5 may be inserted into the case 160 to be adjacent to the electrode assembly 150.

For example, the case 160 may include a first space 172 accommodating the electrode assembly 150 and the electrolyte impregnating the electrode assembly 150; and a second space 174 into which the electrolyte storage unit 5 is inserted.

In an embodiment, as illustrated in FIG. 1, a longitudinal direction of the electrode assembly 150 and a longitudinal direction of the electrolyte storage unit 5 may be parallel to each other.

For example, the longitudinal direction of the electrode assembly 150 may refer to a direction parallel to a long side direction of a cathode (or an anode).

For example, the longitudinal direction of the electrolyte storage unit 5 may refer to a direction parallel to a direction in which the electrolyte storage unit 5 is inserted into the case 160. For example, a longitudinal direction of the first unit 10, a longitudinal direction of a second unit 20, and a longitudinal direction of sub-units (a first sub-unit and a second sub-unit) described later may refer to a direction parallel to the direction in which the electrolyte storage unit 5 is inserted into the case 160.

In an embodiment, the second space 174 may extend in the longitudinal direction of the electrode assembly 150. In an embodiment, a length of the electrode assembly 150 in the longitudinal direction and a length of the electrolyte storage unit 5 in the longitudinal direction may be equivalent to each other.

For example, the case 160 may further include a passage portion 176 between the first space 172 and the second space 174. For example, the supplementary electrolyte accommodated in the electrolyte storage unit 5 may be transferred from the second space 174 to the first space 172.

In an embodiment, the case 160 may include a sealing portion and a non-sealing portion at an outer peripheral portion. For example, the case 160 may include three sealing portions 162, 164 and 166 and a non-sealing portion 168. For example, the non-sealing portion 168 may be formed by folding one sheet.

For example, the first space 172 may include an enclosed space. For example, the second space 174 may include an enclosed space or a space in which at least one side is open.

For example, an outer surface of the electrolyte storage unit 5 (e.g., an outer surface of the first unit) may be in a close contact with an inner surface of the second space 174 so that the supplementary electrolyte may not be leaked to an outside of the case 160.

The electrolyte storage unit 5 may include a first unit 10 and a sub-unit inserted into the first unit 10.

Figure 2:
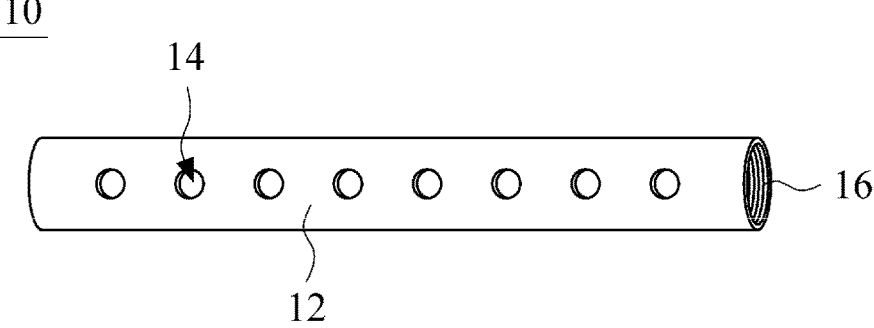
FIG. 2 is a schematic perspective view of a first unit according to exemplary embodiments.

Referring to FIG. 2, the first unit 10 may include a first body 12 having a tubular structure and first holes 14 formed in the first body 12. For example, the first body 12 may have a tubular structure in which both ends are open. For example, at least one of the first holes 14 may be connected to the passage portion 176.

In some embodiments, the first holes 14 may be formed in a line or in series in the first body 12 along the longitudinal direction of the first unit 10.

The sub-unit includes a body having a tubular structure (hereinafter, abbreviated as a tubular body) and sub-holes formed in the tubular body. The sub-unit may be inserted into the first unit 10 such that the sub-holes may be offset from or may not overlap the first holes 14. Accordingly, an enclosed space may be formed in the first unit 10 and the sub-unit. The supplementary electrolyte may be accommodated in the enclosed space.

In some embodiments, the sub-holes may be formed in a line or in series in the tubular body along the longitudinal direction of the sub-unit.

Figure 3:
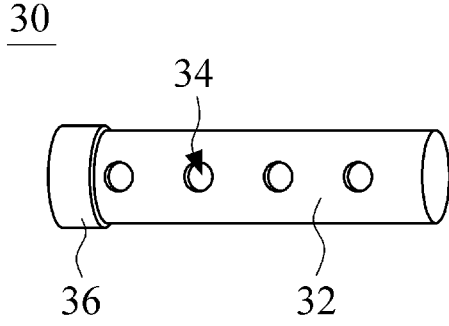
FIGS. 3 and 4 are schematic perspective views of a first sub-unit and a second sub-unit, respectively, according to exemplary embodiments.
Figure 4:
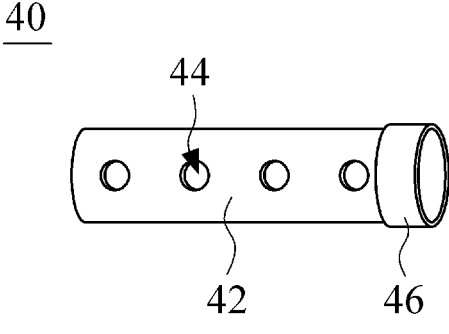

Referring to FIGS. 3 and 4, the sub-unit may include a first sub-unit 30 and a second sub-unit 40. For example, the first sub-unit 30 and the second sub-unit 40 may each be inserted into both ends of the first unit 10.

In some embodiments, the first sub-unit 30 and the second sub-unit 40 may be disposed in the first unit 10 to be spaced apart from each other in the longitudinal direction of the first unit 10.

The first sub-unit 30 may include a first tubular body 32 and first sub-holes 34 formed in the first tubular body 32. For example, the first tubular body 32 may have a tubular structure in which one end is closed and the other end (an end opposite to the one end in the longitudinal direction) is opened.

In some embodiments, the first sub-holes 34 may be formed in a line or in series in the first tubular body 32 along the longitudinal direction of the first sub-unit 30.

The second sub-unit 40 may include a second tubular body 42 and second sub-holes 44 formed in the second tubular body 42. For example, the second tubular body 42 may have a tubular structure in which one end is closed and the other end is opened.

In some embodiments, the second sub-holes 44 may be formed in a line or in series in the second tubular body 42 along the longitudinal direction of the second sub-unit 40.

Figure 5:
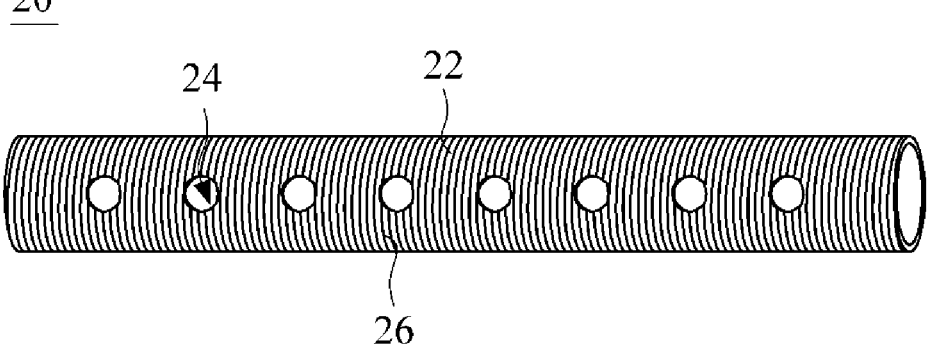
FIG. 5 is a schematic perspective view of a second unit according to exemplary embodiments.

Referring to FIG. 5, in an embodiment, the electrolyte storage unit 5 may further include a second unit 20 inserted between the first unit 10 and the sub-units.

The second unit 20 may include a second body 22 having a tubular structure and second holes 24 formed in the second body 22. For example, the second body 22 may have a tubular structure in which both ends are opened.

In some embodiments, the second holes 24 may be formed in a line or in series in the second body 22 along the longitudinal direction of the second unit 20.

Figure 6:
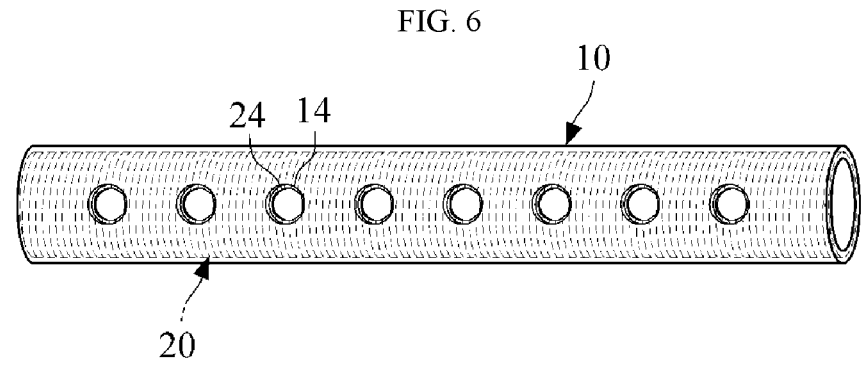
FIG. 6 is a perspective view schematically illustrating a construction in which a second unit is inserted into a first unit according to exemplary embodiments.

Referring to FIG. 6, the second unit 20 may be inserted into the first unit 10 such that at least one of the second holes 24 overlaps at least one of the first holes 14. The sub-units 30 and 40 (not illustrated in FIG. 6) may be inserted into the second unit 20. Accordingly, the second unit 20 may be disposed between the first unit 10 and the sub-unit.

In some embodiments, as illustrated in FIG. 6, the first unit 10 and the second unit 20 may include the same number of holes. For example, the first holes 14 and the second holes 24 may be disposed to overlap each other.

Figure 7:
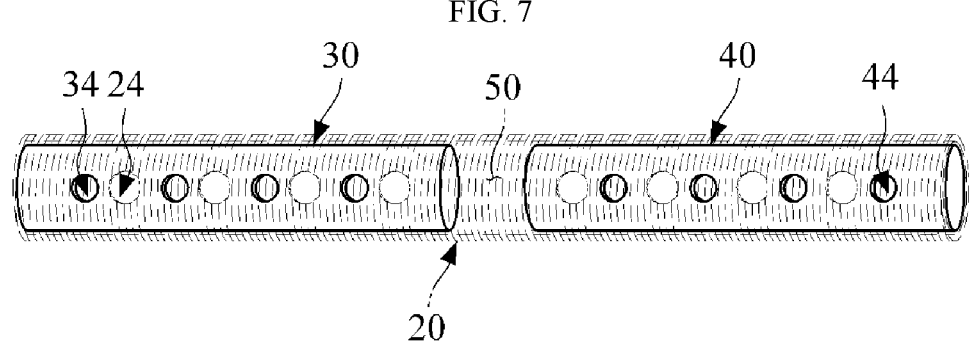
FIG. 7 is a perspective view schematically illustrating a construction in which a first sub-unit and a second sub-unit are inserted into a second unit according to exemplary embodiments.

Referring to FIG. 7, the first sub-unit 30 and the second sub-unit 40 may be inserted into the second unit 20. For example, the first sub-unit 30 and the second sub-unit 40 may each be inserted from both ends of the second unit 10. For example, the first sub-unit 30 and the second sub-unit 40 may be disposed in the second unit 20 to be spaced apart from each other in the longitudinal direction of the second unit 20.

In some embodiments, the first holes 14, the second holes 24, the first sub-holes 34 and the second sub-holes 44 may be arranged in a line or in series along the longitudinal direction of the first unit 10.

For example, the enclosed one end of the first sub-unit 30 and the enclosed one end of the second sub-unit 40 may be disposed to face the outside of the case 160. For example, the second holes 24, the first sub-holes 34 and the second sub-holes 44 may be offset from each other. Accordingly, an enclosed space 50 may be formed in the second unit 20, the first sub-unit 30 and the second sub-unit 40. The supplementary electrolyte may be accommodated in the enclosed space 50.

In an embodiment, as illustrated in FIG. 3, the first sub-unit 30 may include a first packing unit 36 coupled to one end portion thereof. In some embodiments, the first packing unit 36 may be disposed on an outer surface of the closed one end portion of the first tubular body 32. For example, the first packing portion 36 may be disposed between the second unit 20 and the first sub-unit 30. An airtightness of the enclosed space 50 may be improved by the first packing unit 36.

In some embodiments, the first packing unit 36 may surround an outer surface of the enclosed one end portion of the first tubular body 32.

In an embodiment, as illustrated in FIG. 4, the second sub-unit 40 may include a second packing unit 46 coupled to one end portion thereof. In some embodiments, the second packing unit 46 may be disposed on an outer surface of the closed one end portion of the second tubular body 42. For example, the second packing unit 46 may be disposed between the second unit 20 and the second sub-unit 40. An airtightness of the enclosed space 50 may be improved by the second packing unit 46.

In some embodiments, the second packing unit 46 may surround an outer surface of the closed one end portion of the second tubular body 42.

In some embodiments, each of the first sub-unit 30 and the second sub-unit 40 may have a packing unit coupled to an end portion opposite to the one end portion (i.e., the other end portion). Accordingly, the airtightness of the closed space 50 may be further improved.

In an embodiment, the packing unit may include an elastic material. In some embodiments, the elastic material may include a natural rubber, a synthetic rubber or an elastomer.

For example, the elastomer may include a polyolefin-based elastomer, a urethane-based elastomer, a styrene-based block copolymer, a vinyl chloride elastomer, a chlorinated polyethylene elastomer, a polyester-based elastomer, a polyamide-based elastomer, a fluorine-based elastomer, silicone-based elastomers, etc. Preferably, a material having chemical resistance to the electrolyte may be used.

In an embodiment, the material of the packing unit may include the polyolefin-based resin. For example, the polyolefin-based resin may include polyethylene, etc.

For example, when the lithium secondary battery 1 is repeatedly charged and discharged, at least a portion of the electrolyte contained in the first space 172 may be consumed.

In an embodiment, at least one of the first sub-unit 30 and the second sub-unit 40 may be movable at an inside of the first unit 10 in a direction in which a volume of the enclosed space 50 is reduced by an external force (e.g., the longitudinal direction of the first unit).

For example, as the first sub-unit 30 moves, at least one of the first sub-holes 34 is arranged to overlap at least one of the first holes 14 so that the enclosed space 50 may be opened. For example, as the second sub-unit 40 moves, at least one of the second sub-holes 44 is arranged to overlap at least one of the first holes 14 so that the enclosed space 50 may be opened.

For example, the supplementary electrolyte may flow through at least one of the first sub-holes 34 and the second sub-holes 44, at least one of the first holes 14, and the passage portion 176 to be discharged into the first space 172.

Hereinafter, an electrolyte replenishing mechanism according to exemplary embodiments will be described in more detail with reference to FIG. 8

Figure 8:
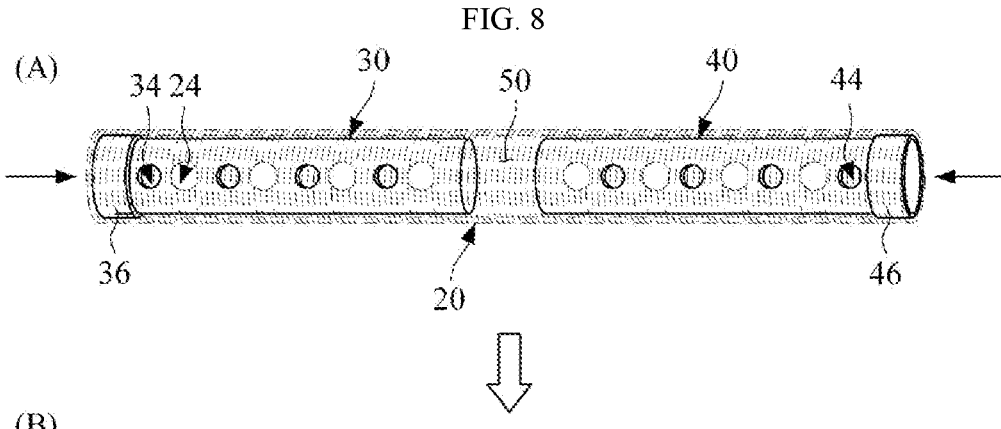
FIG. 8 is a diagram schematically illustrating a mechanism for opening an enclosed space formed by a second unit, a first sub-unit and a second sub-unit according to exemplary embodiments.
Figure 8:
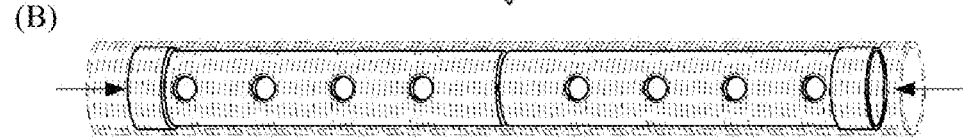

Referring to (A) of FIG. 8, the enclosed one end portion of the first sub-unit 30 and the enclosed one end portion of the second sub-unit 40 may each be disposed to face the outside of the case 160. The second holes 24, the first sub-holes 34 and the second sub-holes 44 may be arranged to be offset from each other, so that the enclosed space 50 may be formed in the second unit 20, the first sub-unit 30 and the second sub-unit 40. The supplementary electrolyte may be accommodated in the enclosed space 50.

Referring to (B) of FIG. 8, the first sub-unit 30 and the second sub-unit 40 may be moved at an inside of the second unit 20 in a direction in which a volume of the enclosed space 50 is reduced by an external force (e.g., the longitudinal direction of the second unit). Accordingly, the second holes 24 and at least one of the first sub-holes 34 and the second sub-holes 44 may overlap each other. Thus, the enclosed space 50 may be opened.

As illustrated in FIG. 6, the first holes 14 and the second holes 24 may overlap each other. Thus, when the enclosed space 50 is opened, the supplementary electrolyte may be moved to the first space 172 through the first holes 14 and the passage portion 176.

As described above, in the lithium secondary battery according to embodiments of the present invention, the electrolyte may be replenished while maintaining the airtightness of the first space 172. Accordingly, damages to the lithium secondary battery due to a permeation of external air and moisture when replenishing the electrolyte may be prevented.

Referring again to FIG. 1, in some embodiments, the passage portion 176 may include a sealing line portion 178. Accordingly, the airtightness of the first space 172 may be further improved. For example, the sealing line portion 178 may be opened by a discharging pressure of the supplementary electrolyte.

In an embodiment, the first unit 10 may have a first coefficient of thermal expansion, and the second unit 20 may have a second coefficient of thermal expansion different from the first coefficient of thermal expansion. For example, the coefficient of thermal expansion may be a linear expansion coefficient.

For example, if the electrolyte storage unit 5 may be exposed to a temperature equal to or lower than a predetermined temperature (e.g., −20° C. or less, preferably −30° C. or less) or higher than a predetermined temperature (e.g., 40° C. or higher, preferably 50° C. or higher), a gap may be generated between the first unit 10 and the second unit 20. For example, the gap may be formed between the first unit 10 and the second unit 20 by cooling or heating the electrolyte storage unit 5 to the predetermined temperature.

For example, the second unit 20 may be physically separated from the first unit 10 by the gap. For example, the gap may not be formed at room temperature, and thus the second unit 20 may not be physically separated from the first unit 10 without damaging the first unit 10. For example, the sub-unit may also be separated from the first unit 10 together with the second unit 20.

In some embodiments, the second unit 20 may be physically separated from the first unit 10 at a temperature ranging from −30° C. to −20° C.

In some embodiments, the second unit 20 may be physically separated from the first unit 10 at a temperature ranging 40° C. to 50° C.

In an embodiment, a gap may be formed between the first unit 10 and the second unit 20 in which the supplementary electrolyte is consumed, so that the second unit 20 in which the supplementary electrolyte is consumed and the sub-unit may be separated from the first unit 10. The supplementary electrolyte may be newly charged in the second unit 20 where the supplementary electrolyte is consumed, and the second unit 20 may be inserted again into the first unit 10. In this case, the sealing line portion 178 may be reformed to maintain the airtightness of the first space 172.

Figure 9:
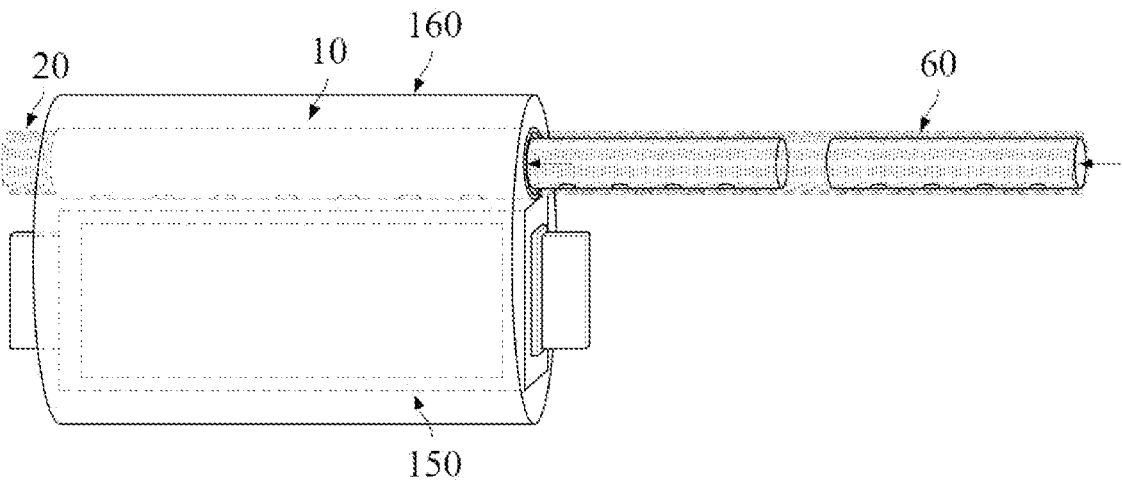
FIG. 9 is a diagram schematically illustrating a mechanism for replacing a second unit to a second sub-unit according to exemplary embodiments.

Referring to FIG. 9, in an embodiment, a replacement unit 60 including the second unit 20 filled with the supplementary electrolyte and the sub-unit may be additionally prepared and inserted into the first unit 10.

In exemplary embodiments, a gap may be formed between the first unit 10 and the second unit 20 in which the supplementary electrolyte is consumed. The replacement unit 60 may be inserted into the first unit 10, and the second unit 20 in which the supplementary electrolyte is consumed may be separated by being pushed from the first unit 10. The sub-unit may be separated from the first unit 10 together with the second unit 20. In this case, the replacement may be performed while maintaining the airtightness of the first space 172.

In some embodiments, the replacement may be performed under a low-temperature condition (e.g., −20° C. or less, or −30° C. or less) or a high-temperature condition (e.g., 40° C. or higher, or 50° C. or higher). Preferably, the replacement may be performed under the low-temperature condition. In this case, deformation of the electrolyte under the high temperature condition may be avoided.

In some embodiments, an absolute difference between the first coefficient of thermal expansion and the second coefficient of thermal expansion may be 5 μm/K or more, 10 μm/K or more, or 20 μm/K or more. Within the above range, the separation may be implemented without deterioration of the lithium secondary battery.

In some embodiments, the absolute difference between the first coefficient of thermal expansion and the second coefficient of thermal expansion may be 50 μm/K or less, 40 μm/K or less, or 30 μm/K or less. Within the above range, the airtightness of the first space 172 may be improved. Within this range, penetration of external air and moisture into the first space 172 during the separation process may be effectively prevented.

A high-temperature environment may be created by a heat generation during repeated charging and discharging of the lithium secondary battery. In some embodiments, the second coefficient of thermal expansion may be greater than the first coefficient of thermal expansion. In this case, the gap between the first unit 10 and the second unit 20 may be formed at a low temperature, and the gap may not be formed at a high temperature. Accordingly, high-temperature durability of the electrolyte storage unit 5 may be improved.

In some embodiments, each of the first unit 10 and the second unit 20 may be formed of a metal such as stainless steel, copper, zinc, aluminum, manganese, tungsten, molybdenum, nickel, iron, silver, etc.; a polymer such as EP (Engineering plastic) and PET; and a ceramic such as $Al_2O_3$ and $TiO_2$. These may be used alone or in combination thereof.

In some embodiments, the first unit 10 may include stainless steel and the second unit 20 may include aluminum.

For example, the first unit 10, the second unit 20 and the sub-unit may include a material that may have a chemical resistance to the supplementary electrolyte (e.g., that nay not cause a side reaction with the supplementary electrolyte).

In some embodiments, the sub-unit may include a metal such as stainless steel, copper, zinc, aluminum, manganese, tungsten, molybdenum, nickel, iron, silver, etc.; a polymer such as EP (Engineering plastic) and PET; and a ceramic such as $Al_2O_3$ and $TiO_2$. These may be used alone or in combination thereof.

In some embodiments, the sub-unit may include stainless steel, aluminum, etc.

In some embodiments, an inner surface of the first body 12 and an outer surface of the second body 22 may include screw structures 16 and 26 that may be fastened to each other. In this case, the airtightness of the enclosed space 50 may be further improved.

In some embodiments, the second space 174 may be formed at the non-sealing portion 168. Accordingly, the electrolyte storage unit 5 may be easily attached and inserted to the second space 174. In addition, durability against repeated attachment and detachment of the second unit 20 and the second sub-unit 40 may be obtained.

Figure 10:
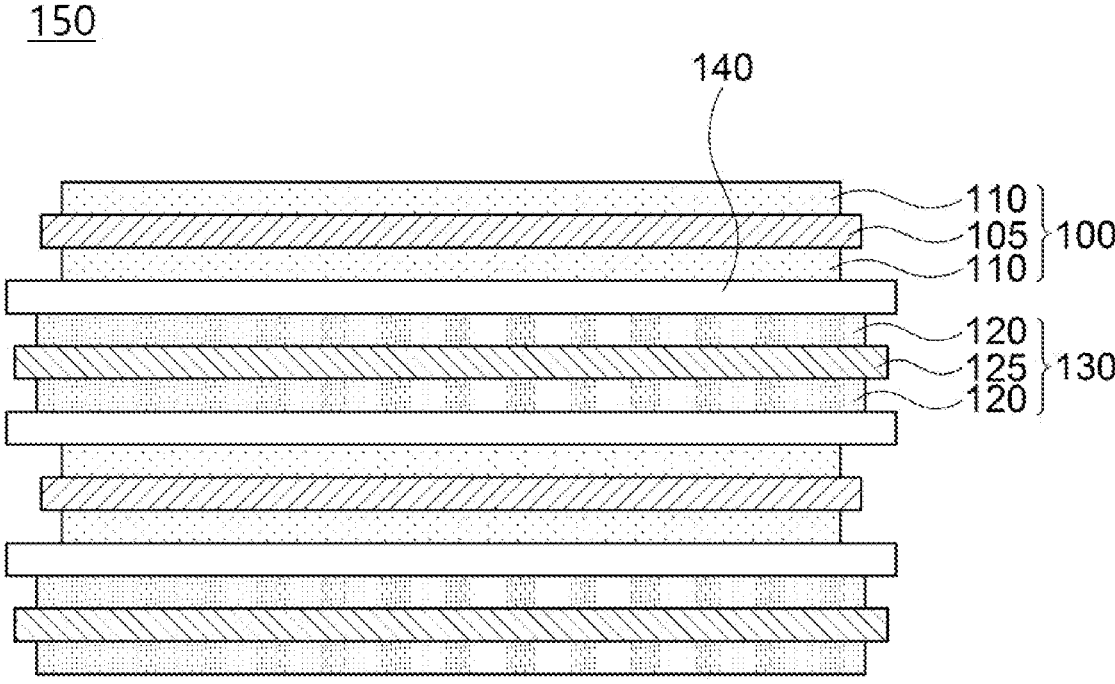
FIG. 10 is a schematic cross-sectional view of an electrode assembly according to exemplary embodiments.

Referring to FIG. 10, the electrode assembly 150 may include a cathode 100 and an anode 130 facing the cathode 100.

For example, the cathode 100 may include a cathode current collector 105 and a cathode active material layer 110 on the cathode current collector 105.

For example, the cathode active material layer 110 includes a cathode active material, and may further include a cathode binder and a conductive material.

For example, the cathode current collector 105 may include stainless steel, nickel, aluminum, titanium, copper, or an alloy thereof.

For example, the cathode active material may include a material capable of reversibly intercalating and de-intercalating lithium ions. For example, the cathode active material may include lithium metal oxide particles. For example, materials widely known in the related art may be used as the cathode binder and the conductive material without a particular limitation.

For example, the anode 130 may include an anode current collector 125 and an anode active material layer 120 on the anode current collector 125.

For example, the anode active material layer 120 includes an anode active material, and may further include an anode binder and a conductive material.

For example, the anode current collector 125 may include gold, stainless steel, nickel, aluminum, titanium, copper, or an alloy thereof.

For example, the anode active material may be a material capable of adsorbing and desorbing lithium ions. For example, the anode active material may include a lithium alloy, a carbon-based active material, a silicon-based active material, etc. For example, the anode binder and the conductive material widely known in the related art may be used without a particular limitation.

In some embodiments, a separation layer 140 may be interposed between the anode 100 and the cathode 130. For example, the separation layer 140 may include a material widely known in the related art without a particular limitation.

For example, the electrode assembly 150 may be formed by alternately and repeatedly stacking the cathode 100, the anode 130 and the separation layer 140. For example, the electrode assembly 150 may be formed by winding, lamination or z-folding of the separation layer 140.

Referring again to FIG. 1, the lithium secondary battery according to exemplary embodiments includes a cathode lead 107 connected to the cathode 100 and protruding to the outside of a case 160; and an anode lead 127 connected to the anode 130 and protruding to the outside of the case 160.

For example, the cathode 100 and the cathode lead 107 may be electrically connected. The anode 130 and the anode lead 127 may be electrically connected.

For example, the cathode lead 107 may be electrically connected to the cathode current collector 105. The anode lead 127 may be electrically connected to the anode current collector 125.

For example, the cathode current collector 105 may include a cathode tab protruding at one side thereof. The cathode active material layer 110 may not be formed on the cathode tab 106. The cathode tab 106 may be integral with the cathode current collector 105 or may be connected to the cathode current collector 105 by, e.g., welding. The cathode current collector 105 and the cathode lead 107 may be electrically connected via the cathode tab 106.

The anode current collector 125 may include an anode tab 126 protruding at one side thereof. The anode active material layer 120 may not be formed on the anode tab 126. The anode tab 126 may be integral with the anode current collector 125 or may be connected to the anode current collector 125 by, e.g., welding. The anode electrode current collector 125 and the anode lead 127 may be electrically connected via the anode tab.

For example, the electrode assembly 150 may include a plurality of the cathodes and a plurality of the anodes. For example, each of the plurality of the cathodes may include the cathode tab, and each of the plurality of the anodes may include the anode tab.

For example, the cathode tabs (or the anode tabs) may be laminated, pressed and welded to form a cathode tab stack (or an anode tab stack). The cathode tab stack may be electrically connected to the cathode lead 107. The anode tab stack may be electrically connected to the anode lead 127.

For example, the electrolyte solution and the supplementary electrolyte may include a lithium salt, an organic solvent, and may optionally further include an additive. For example, materials widely known in the related art may be used as the lithium salt, the organic solvent and the additive without a particular limitation.

What is claimed is:

1. A lithium secondary battery, comprising:
    an electrode assembly including a cathode and an anode facing the cathode;
    a case accommodating the electrode assembly;
    an electrolyte accommodated in the case together with the electrode assembly; and
    an electrolyte storage unit inserted into the case to supply a supplementary electrolyte,
    wherein the electrolyte storage unit comprises:
        a first unit comprising a first body having a tubular structure and first holes formed through the first body; and
        a sub-unit comprising a tubular body and sub-holes formed through the tubular body, wherein the sub-unit is inserted into the first unit so that the sub-holes are offset from the first holes.

2. The lithium secondary battery according to claim 1, wherein the electrolyte storage unit further comprises a second unit that comprises a second body having a tubular structure and second holes formed through the second body, and the second unit is inserted between the first unit and the sub-unit so that at least one of the second holes overlaps at least one of the first holes.

3. The lithium secondary battery according to claim 2, wherein the second holes are arranged to be offset from the sub-holes.

4. The lithium secondary battery according to claim 2, wherein an inner surface of the first body and an outer surface of the second body have screw structures to be fastened to each other.

5. The lithium secondary battery according to claim 2, wherein the first unit has a first coefficient of thermal expansion, and the second unit has a second coefficient of thermal expansion different from the first coefficient of thermal expansion.

6. The lithium secondary battery according to claim 5, wherein the second coefficient of thermal expansion is greater than the first coefficient of thermal expansion.

7. The lithium secondary battery according to claim 5, wherein the second unit is physically separable from the first unit at a temperature of −20° C. or less, or 40° C. or higher.

8. The lithium secondary battery according to claim 1, wherein the sub-unit comprises a first sub-unit and a second sub-unit which are inserted into both end portions of the first unit.

9. The lithium secondary battery according to claim 8, wherein the electrolyte storage unit further comprises:

a first packing unit coupled to one end portion of the first sub-unit; and a second packing unit coupled to one end portion of the second sub-unit.

10. The lithium secondary battery according to claim 8, wherein the first sub-unit and the second sub-unit are disposed in the first unit to be spaced apart from each other in a longitudinal direction of the first unit.

11. The lithium secondary battery according to claim 10, wherein the first sub-unit and the second sub-unit are movable by an external force in the longitudinal direction so that at least one of the sub-holes overlaps at least one of the first holes.

12. The lithium secondary battery according to claim 1, wherein the case comprises:

a first space accommodating the electrode assembly and the electrolyte;

a second space into which the electrolyte storage unit is inserted; and a passage portion through which the supplementary electrolyte is capable of being transferred between the first space and the second space.

13. The lithium secondary battery according to claim 12, wherein the second space extends in a longitudinal direction of the electrode assembly.

14. The lithium secondary battery according to claim 12, wherein the passage portion comprises a sealing line portion that is capable of being opened by a pressure due to a discharge of the supplementary electrolyte.

15. A method of replenishing an electrolyte in a lithium secondary battery, comprising:

preparing the lithium secondary battery of claim 1; and discharging the supplementary electrolyte from the electrolyte storage unit to a peripheral portion of the electrode assembly when at least a portion of the electrolyte is consumed.

16. The method according to claim 15, wherein the discharging the supplementary electrolyte comprises moving the sub-unit so that at least one of the sub-holes overlaps at least one of the first holes.

17. The method according to claim 15, wherein the electrolyte storage unit further comprises a second unit comprising a second body having a tubular structure and second holes formed through the second body, and the second unit is inserted between the first unit and the sub-unit so that at least one of the second holes overlaps at least one of the first holes.

18. The method according to claim 17, further comprising:

cooling or heating the lithium secondary battery to form a gap between the first unit and the second unit in the electrolyte storage unit from which the supplementary electrolyte is discharged;

preparing a replacement unit that comprises a second unit and a sub-unit filled with a supplementary electrolyte; and inserting the replacement unit filled with the supplementary electrolyte into the first unit to separate the second unit and the sub-unit from which the supplementary electrolyte is discharged from the first unit.

* * * * *